US012767275B2

(12) United States Patent
Collier et al.

(10) Patent No.: US 12,767,275 B2
(45) Date of Patent: Oct. 20, 2026

(54) CRESCENT STEP HULL DEVICE

(71) Applicants: Christopher Collier, Myakka City, FL (US); Barbara Collier, Myakka City, FL (US)

(72) Inventors: Christopher Collier, Myakka City, FL (US); Barbara Collier, Myakka City, FL (US)

( * ) Notice: Subject to any disclaimer, the term of this patent is extended or adjusted under 35 U.S.C. 154(b) by 360 days.

(21) Appl. No.: 18/436,092

(22) Filed: Feb. 8, 2024

(65) Prior Publication Data

US 2025/0042510 A1 Feb. 6, 2025

Related U.S. Application Data

(60) Provisional application No. 63/516,549, filed on Jul. 31, 2023.

(51) Int. Cl.

| | |
|---|---|
| ***B63B 1/20*** | (2006.01) |
| ***B63B 1/38*** | (2006.01) |
| ***B63B 35/34*** | (2006.01) |
| ***B63B 35/38*** | (2006.01) |

(52) U.S. Cl.
CPC .......... *B63B 1/20* (2013.01); *B63B 2001/202* (2013.01); *B63B 1/38* (2013.01); *B63B 35/34* (2013.01); *B63B 35/38* (2013.01); *Y02T 70/10* (2013.01)

(58) Field of Classification Search
CPC ................ B63B 1/20; B63B 2001/202; B63B 2001/201; B63B 1/38; B63B 1/125; B63B 1/322; B63B 2001/206; B63B 35/38; B63B 35/34; B63B 35/00; B63B 2001/126; B63B 3/06; B63B 1/121; B63H 19/08
USPC .... 114/291, 67 A, 272, 290, 274, 289, 61.1, 114/67 R, 140, 271, 39.26
See application file for complete search history.

(56) References Cited

U.S. PATENT DOCUMENTS

| | | | | | |
|---|---|---|---|---|---|
| 2,029,215 | A | * | 1/1936 | Atwood | B64C 35/00 114/291 |
| 2,375,973 | A | * | 5/1945 | Cooper | B64C 35/00 114/291 |
| 2,391,326 | A | * | 12/1945 | Mckinley | B64C 35/00 114/291 |
| 3,675,605 | A | | 7/1972 | Knerr | |
| 4,031,841 | A | * | 6/1977 | Bredt | B63B 1/38 114/67 A |
| 4,083,320 | A | | 4/1978 | Yost | |
| 4,802,428 | A | * | 2/1989 | Lang | B63B 39/06 114/283 |

(Continued)

*Primary Examiner* — Lars A Olson
*Assistant Examiner* — Eric Anthony Starck
(74) *Attorney, Agent, or Firm* — Brennan, Manna & Diamond, LLC

(57) ABSTRACT

A crescent step hull device is disclosed for aluminum or fiberglass pontoon boat hulls to create a less wetted surface to reduce drag for a more fuel-efficient bottom and better performance. The crescent step hull device comprises a body component, which is the hull, that features notches and/or added-on steps to the bottom, thereby introducing air to the wetted surface, which will reduce the surface tension or drag and improve the overall efficiency of the pontoon boat. Specifically, the device comprises 1, 2, 3, or 4 cross-sections cut into (i.e., notched) or added onto each hull from approximately ¼" to 4" in size. Thus, the hull can have a notched step, an added-on step, a parallel step, or combinations of the three.

8 Claims, 4 Drawing Sheets

(56) References Cited

U.S. PATENT DOCUMENTS

| | | | | |
|---|---|---|---|---|
| 5,184,561 | A * | 2/1993 | Nickell, Jr. | B63B 1/12<br>114/292 |
| 5,619,944 | A | 4/1997 | Baker | |
| 5,718,184 | A | 2/1998 | Holland | |
| 7,458,327 | B1 | 12/2008 | Dunkerson | |
| 2008/0156246 | A1* | 7/2008 | Loui | B63B 1/22<br>114/288 |
| 2012/0042820 | A1* | 2/2012 | Brekke | B63B 1/38<br>114/291 |

* cited by examiner

CRESCENT STEP HULL DEVICE

CROSS-REFERENCE TO RELATED APPLICATION

The present application claims priority to, and the benefit of, U.S. Provisional Application No. 63/516,549, which was filed on Jul. 31, 2023, and is incorporated herein by reference in its entirety.

FIELD OF THE INVENTION

The present invention relates generally to the field of crescent step hull devices. More specifically, the present invention relates to a crescent step for aluminum or fiberglass pontoon boat hulls for reducing drag and improving fuel efficiency. Accordingly, the present disclosure makes specific reference thereto. Nonetheless, it is to be appreciated that aspects of the present invention are also equally applicable to other like applications, devices and methods of manufacture.

BACKGROUND

By way of background, this invention relates to improvements in crescent step hull devices. Generally, current designs for hulls on a pontoon boat have been unchanged for several years. These aspects are not fuel efficient and do not perform well. Accordingly, people may be looking for improvements to pontoon boats that can help create lift and reduce wetted surfaces for less drag to improve performance.

Generally, stepped hulls incorporate transverse discontinuities, or “steps,” aft of the watercraft’s center of gravity and center of pressure. These steps are generally transverse or substantially transverse (perpendicular to the watercraft’s centerline), and break the one large, low-aspect-ratio hull into multiple high-aspect-ratio planing surfaces, thereby making the hull more efficient. Accordingly, a stepped hull may be operated with less drag and an optimal trim angle under all speeds. This makes the resistance increase more linearly with speed, rather than exponentially, and enables the boat to reach much higher speeds, or operate at higher efficiencies than the non-stepped hull. Further, the steps of a stepped hull cause a reduction in the wetted area of the hull at high speeds, which is favorable for speed and efficiency.

Accordingly, there is a demand for an improved crescent step hull device that provides users with a step for pontoon boat hulls to reduce drag and improve fuel efficiency. More particularly, there is a demand for a crescent step hull device that includes one to four cross-sections cut into or added onto a pontoon boat hull to maximize performance for the watercraft.

Therefore, there exists a long felt need in the art for a crescent step hull device that provides users with a step for aluminum or fiberglass pontoon boat hulls for reducing drag and improving fuel efficiency. There is also a long felt need in the art for a crescent step hull device that includes one to four cross sections cut into or added onto each hull to maximize performance for the watercraft. Further, there is a long felt need in the art for a crescent step hull device that features an added-on step to create lift and reduce the wetted surface. Moreover, there is a long felt need in the art for a device that features a notched step for reducing the wetted surface for less drag. Further, there is a long felt need in the art for a crescent step hull device that features a parallel step for better fuel efficiency. Finally, there is a long felt need in the art for a crescent step hull device that helps improve the overall performance for any pontoon boat.

The subject matter disclosed and claimed herein, in one embodiment thereof, comprises a crescent step hull device. The device is a boat hull that can be used on aluminum or fiberglass pontoon boat hulls to create a less wetted surface to reduce drag for a more fuel-efficient bottom and better performance. The crescent step hull device comprises a body component that features notches and/or add-on steps to the bottom, thereby introducing air to the wetted surface, which will reduce the surface tension or drag and improve the overall efficiency of the boat. Specifically, the device comprises 1, 2, 3, or 4 cross-sections cut into (i.e., notched) or added onto each hull from approximately ¼" to 4" in size. Thus, an added-on step will create lift and reduce the wetted surface for less drag creating a more efficient bottom with better performance. The notched step will reduce the wetted surface for less drag creating a more efficient bottom with better performance. The parallel step bottom can either be created by reducing the diameter of the tube size or reshaping the tube at the notch point, keeping it parallel or adjusting the angle compared to the keel approximately + or −10 degrees. Thus, the purpose of adding the step device to the keel will reduce the wetted running surface, reducing drag and increasing performance and fuel efficiency.

In this manner, the crescent step hull device of the present invention accomplishes all of the forgoing objectives and provides users with a device that provides a step for pontoon boat hulls. The device is a notched step, an added-on step, a parallel step, or a combination of the three. The device can be used on all pontoon boats to create lift and reduce the wetted surface.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a crescent step hull device. The device is a boat hull that can be used on pontoon boat hulls to create a less wetted surface to reduce drag for a more fuel-efficient bottom and better performance. The crescent step hull device comprises a body component, which is the hull, that features notches and/or add-on steps to the bottom, thereby introducing air to the wetted surface, which will reduce the surface tension or drag and improve the overall efficiency of the boat. Thus, the purpose of adding the step device to the keel will reduce the wetted running surface, reducing drag and increasing performance and fuel efficiency.

Generally, most pontoon boats comprise two to three pontoons or hulls, connected by a frame or deck which is surrounded by a frame. Each of the hulls generally includes a hull bottom that includes a keel, a deadrise on either side of the keel, a chine at the interface between the deadrise and a sidewall, a bow portion, a stern portion, a transom in the stern portion, and a centerline running between the bow portion and the stern portion. In this invention, the hulls also include one or more steps. Further, a step in a hull is a longitudinal notch that runs from chine to chine and comes high enough on the side of the boat to reach above the waterline when the boat is on a plane. Low pressure is generated just aft of the step as the boat moves forward, creating suction that draws in air from the sides. As speed increases and the boat generates more and more lift, the section of the hull just aft of the step becomes completely free of the water. Drag and friction are reduced, and as a result, the boat can go faster without burning more fuel or adding more horsepower. Accordingly, the device provides a stepped boat hull that can be used on aluminum or fiberglass pontoon boat hulls to create a less wetted surface to reduce drag for a more fuel-efficient bottom and better performance.

In one embodiment, the crescent step hull device comprises a body component, which is the hull plus at least one notch and/or add-on step positioned on the bottom, thereby introducing air to the wetted surface, which will reduce the surface tension or drag and improve the overall efficiency of the pontoon boat. The body component is sized and shaped to resemble a conventional pontoon boat hull and can be available in different sizes and shapes depending on the size and shape of the pontoon boat to which it is attached.

In one embodiment, the crescent hull device comprises 1, 2, 3, or 4 cross-sections (i.e., steps) cut into (i.e., notched) or added onto each hull. The cross-sections can be crescent shaped or any other suitable shape as is known in the art, depending on the needs and/or wants of a user. Further, the cross-sections that are cut into or added onto each hull can be any suitable shape and size as is known in the art, but generally are from approximately ¼" to 4" in size. Additionally, in a plan view, the angles of the cross-sections can vary from 0 to 50 degrees.

In one embodiment, the step in the hull is at least one added-on step, which will create lift and reduce the wetted surface for less drag creating a more efficient bottom with better performance.

In one embodiment, the step in the hull is at least one notched step, which will reduce the wetted surface for less drag creating a more efficient bottom with better performance.

In one embodiment, the step in the hull is a combination of at least one notched step and at least one added-on step, which also creates lift and reduces the wetted surface for less drag creating a more efficient bottom with better performance.

In one embodiment, the step in the hull is a parallel step. Wherein, the parallel step on the bottom of the hull can either be created by reducing the diameter of the tube size of the hull or by reshaping the tube at the notch point keeping it parallel or adjusting the angle compared to the keel approximately + or −10 degrees. Thus, the purpose of adding the step device to the keel will reduce the wetted running surface, reducing drag and increasing performance and fuel efficiency.

However, it will be understood that these steps are configured for optimizing air intake and retention in the hull. In one embodiment, the steps may divide the hull bottom into three planing surfaces, one being in the bow portion, a second being in the middle portion, and a third being in the stern portion. In another embodiment, the steps can be positioned in any suitable position on the bottom of the hull, depending on the needs and/or wants of a user. Typically, the steps on the bottom of the hull are positioned, such that they allow air from the steps to flow aftward, that is, toward the transom of the stepped hulls. This air creates lift and reduces the friction between the hull and the water. Accordingly, this reduction in a wetted hull surface makes the watercraft (i.e., pontoon boat) faster and more efficient during use.

In yet another embodiment, the crescent step hull device comprises a plurality of indicia.

In yet another embodiment, a method of including at least one step on a pontoon boat hull to reduce drag and improve fuel efficiency is disclosed. The method includes the steps of providing a crescent step hull device comprising a body component, which is the hull. The method also comprises providing at least one notched step to the hull. Further, the method comprises providing at least one added-on step to the hull. The method comprises providing a parallel step for the hull. Further, the method comprises adding a combination of the notched step and the added-on step to the hull. Finally, the method comprises securing the stepped hull (i.e., the crescent step hull device) to a pontoon boat for use.

Numerous benefits and advantages of this invention will become apparent to those skilled in the art to which it pertains, upon reading and understanding the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1A:
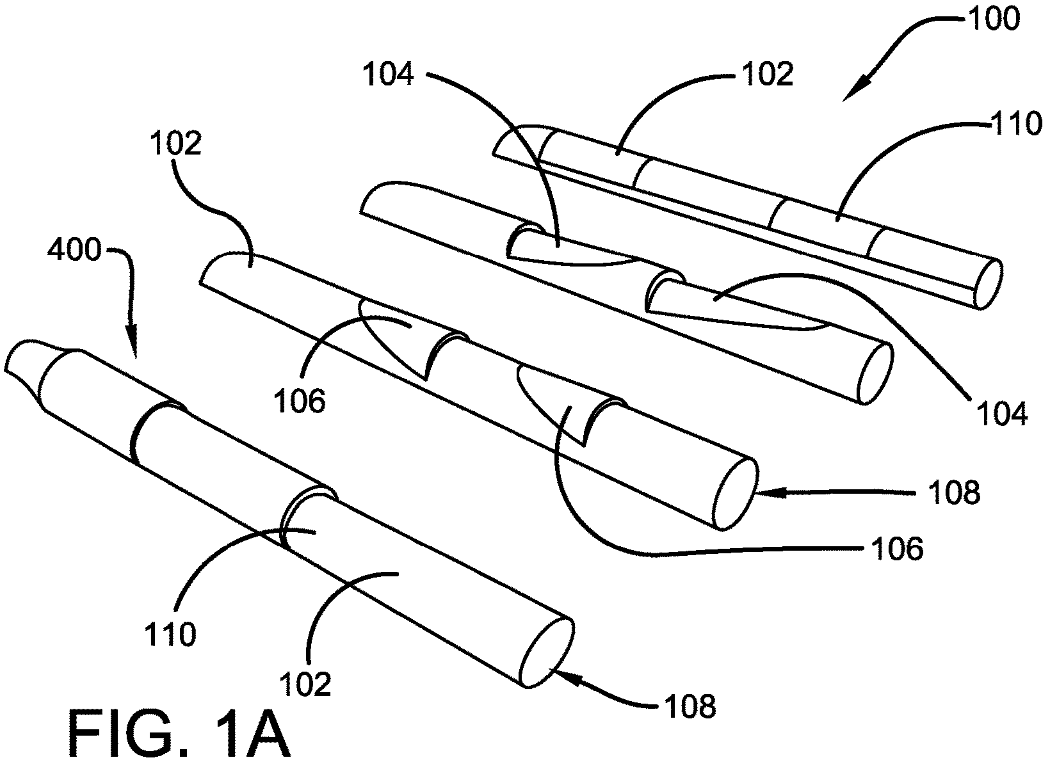
FIGS. 1A-B illustrate a perspective view of one embodiment of the crescent step hull device of the present invention showing the variety of hull devices in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long felt need in the art for a crescent step hull device that provides users with a step for aluminum or fiberglass pontoon boat hulls for reducing drag and improving fuel efficiency. There is also a long felt need in the art for a crescent step hull device that includes one to four cross sections cut into or added onto each hull to maximize performance for the watercraft. Further, there is a long felt need in the art for a crescent step hull device that features an added-on step to create lift and reduce the wetted surface. Moreover, there is a long felt need in the art for a device that features a notched step for reducing the wetted surface for less drag. Further, there is a long felt need in the art for a crescent step hull device that features a parallel step for better fuel efficiency. Finally, there is a long felt need in the art for a crescent step hull device that helps improve the overall performance for any pontoon boat.

The present invention, in one exemplary embodiment, is a novel crescent step hull device that can be used on aluminum or fiberglass pontoon boat hulls to create a less wetted surface to reduce drag for a more fuel-efficient bottom and better performance. The crescent step hull device comprises a body component (i.e., the hull) that features notches and/or add-on steps to the bottom, thereby introducing air to the wetted surface, which will reduce the surface tension or drag and improve the overall efficiency of the boat. Specifically, the device comprises 1, 2, 3, or 4 cross-sections cut into (i.e., notched) or added onto each hull from approximately ¼" to 4" in size. The present invention also includes a novel method of including at least one step on a pontoon boat hull to reduce drag and improve fuel efficiency. The method includes the steps of providing a crescent step hull device comprising a body component, which is the hull. The method also comprises providing at least one notched step to the hull. Further, the method comprises providing at least one added-on step to the hull. The method comprises providing a parallel step for the hull. Further, the method comprises adding a combination of the notched step and the added-on step to the hull. Finally, the method comprises securing the stepped hull (i.e., the crescent step hull device) to a pontoon boat for use.

Figure 1B:
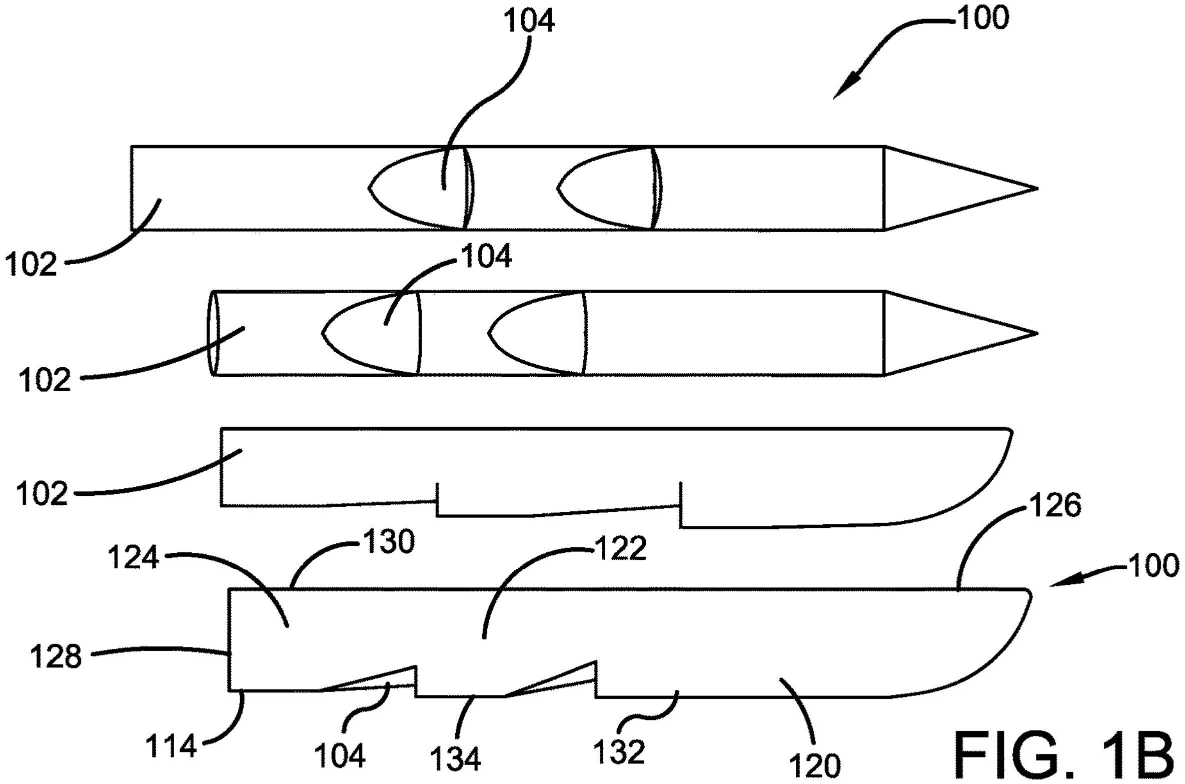

Referring initially to the drawings, FIGS. 1A-B illustrate a perspective view of one embodiment of the crescent step hull device 100 of the present invention. In the present embodiment, the crescent step hull device 100 is an improved crescent step hull device 100 that provides a user with a step 104, 106 for a pontoon boat hull 108 for reducing drag and improving fuel efficiency. Specifically, the crescent step hull device 100 comprises a body component 102, which is the hull 108, that features notches 104 and/or add-on 106 steps to the bottom 110 of the hull 108, thereby introducing air to the wetted surface, which will reduce the surface tension or drag and improve the overall efficiency of the pontoon boat 112. Thus, the purpose of adding the step device 100 to the keel 114 will reduce the wetted running surface, reducing drag and increasing overall performance and fuel efficiency.

Figure 6A:
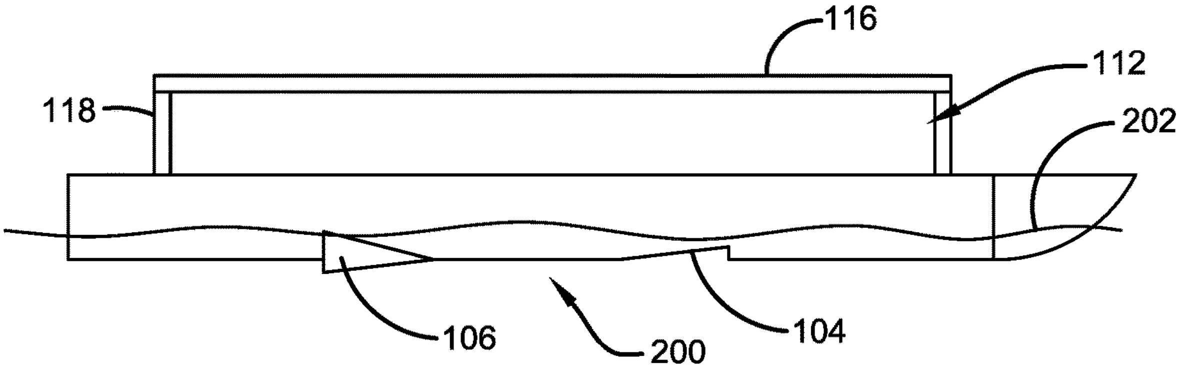
FIGS. 6A-B illustrate a perspective view of one embodiment of the crescent step hull device of the present invention showing the hull device in use secured to a pontoon boat in accordance with the disclosed architecture.

As shown in FIG. 6A, generally, most pontoon boats 112 comprise two to three pontoons or hulls 108, connected by a deck 116 which is surrounded by a frame 118. Each of the hulls 108 generally includes a hull bottom 110 that includes a keel 114, a deadrise 120 on either side of the keel 114, a chine 122 at the interface between the deadrise 120 and a sidewall 124, a bow portion 126, a stern portion 128, a transom 130 in the stern portion 128, and a centerline 132 running between the bow portion 126 and the stern portion 128. In this invention, the hulls 108 also include one or more steps 104, 106. Further, a step 104, 106 in a hull 108 is a longitudinal notch that runs from chine 122 to chine 122 and comes high enough on the side of the boat 112 to reach above the waterline when the boat 112 is on a plane. Low pressure is generated just aft 134 of the step 104, 106 as the boat 112 moves forward, creating suction that draws in air from the sides. As speed increases and the boat 112 generates more and more lift, the section of the hull 108 just aft 134 of the step 104, 106 becomes completely free of the water. Drag and friction are reduced, and as a result, the boat 112 can go faster without burning more fuel or adding more horsepower. Accordingly, the device 100 provides a stepped boat hull (i.e., body component 102) that can be used on aluminum or fiberglass pontoon boat hulls 108 to create a less wetted surface to reduce drag for a more fuel-efficient bottom and better performance.

Furthermore, the crescent step hull device 100 comprises a body component 102, which is the hull 108 plus at least one notch 104 and/or add-on 106 step positioned on the bottom 110, thereby introducing air to the wetted surface, which will reduce the surface tension or drag and improve the overall efficiency of the pontoon boat 112. The body component 102 is sized and shaped to resemble a conventional pontoon boat hull 108 and can be available in different sizes and shapes depending on the size and shape of the pontoon boat 112 to which it is attached.

Additionally, the crescent hull device 100 comprises 1, 2, 3, or 4 cross-sections (i.e., steps 104, 106) cut into (i.e., notched 104) or added onto 106 each hull 108. The cross-sections 104, 106 can be crescent shaped or any other suitable shape as is known in the art, depending on the needs and/or wants of a user. Further, the cross-sections 104, 106 that are cut into 104 or added onto 106 each hull 108 can be any suitable shape and size as is known in the art, but generally are from approximately ¼" to 4" in size. Additionally, in a plan view, the angles of the cross-sections 104, 106 can vary from approximately 0 to 50 degrees.

Figure 2A:
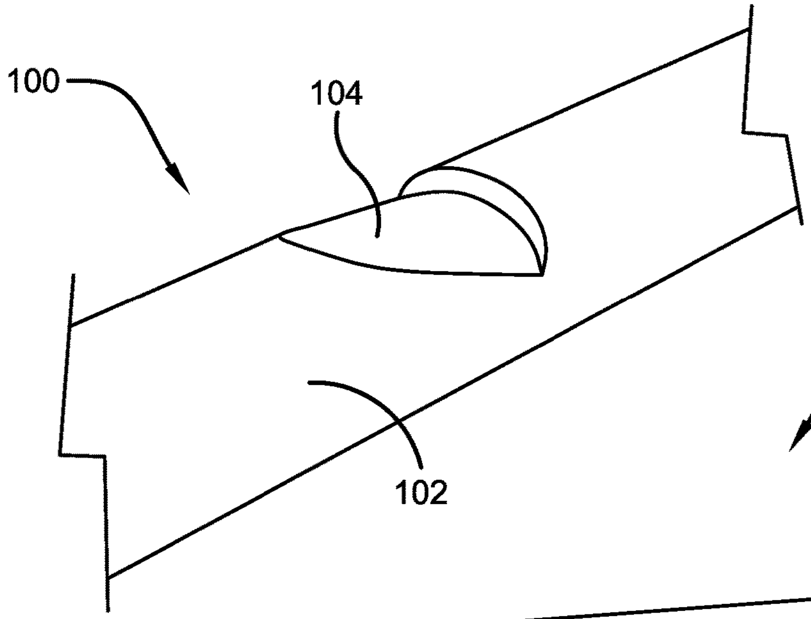
FIGS. 2A-B illustrate a perspective view of one embodiment of the crescent step hull device of the present invention showing the hull device as a notched step in accordance with the disclosed architecture.
Figure 2B:
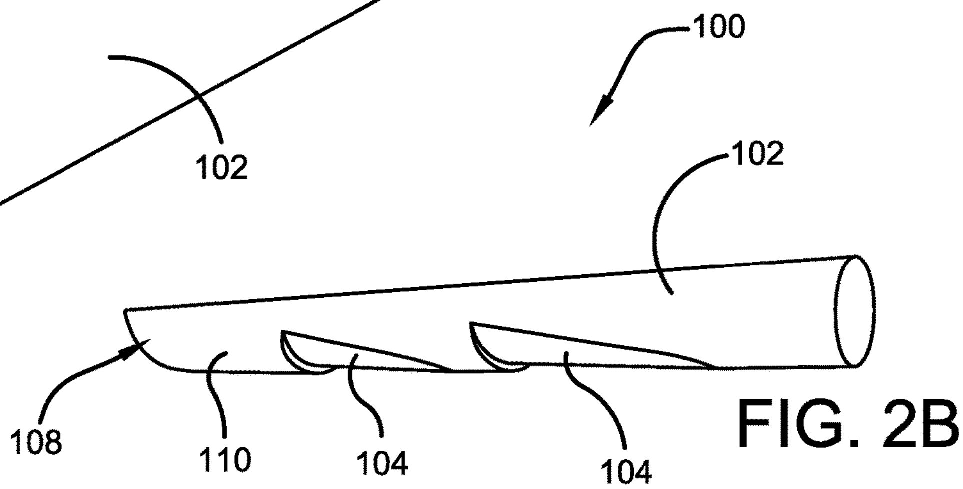

As shown in FIGS. 2A-B, the step 104, 106 in the hull 108 is at least one notched step 104, which will reduce the wetted surface for less drag creating a more efficient bottom 110 with better performance. The notched step 104 is a cut-out or cut-away of the bottom 110 of the hull 108. The notched step 104 can be any suitable size and shape as is known in the art, but is typically a crescent or wedge-like shape. Any suitable number of notched steps 104 can be utilized on the hull 108 depending on the size of the hull 108 and the amount of lift a user wants to create. Further, the notched steps 104 can be positioned in any suitable position on the bottom 110 of the hull 108. For example, a single notched step 104 will provide two planing surfaces, or pressure points on a boat 112. It can maintain an optimum angle of attack while coming onto plane and running. In the case of a two stepped hull design, the lifting surfaces should be even more efficient, and certainly more so than the single surface that a non-stepped hull will deliver. In another embodiment, the notched steps 104 may divide the hull bottom 110 into three planing surfaces, one being in the bow portion 126, a second being in the middle portion 200, and a third being in the stern portion 128. Thus, the notched steps 104 on the bottom 110 of the hull 108 are positioned, such that they allow air from the notched steps 104 to flow aftward 134, that is, toward the transom 130 of the stepped hulls 102. This air creates lift and reduces the friction between the hull 108 and the water 202.

Figure 3A:
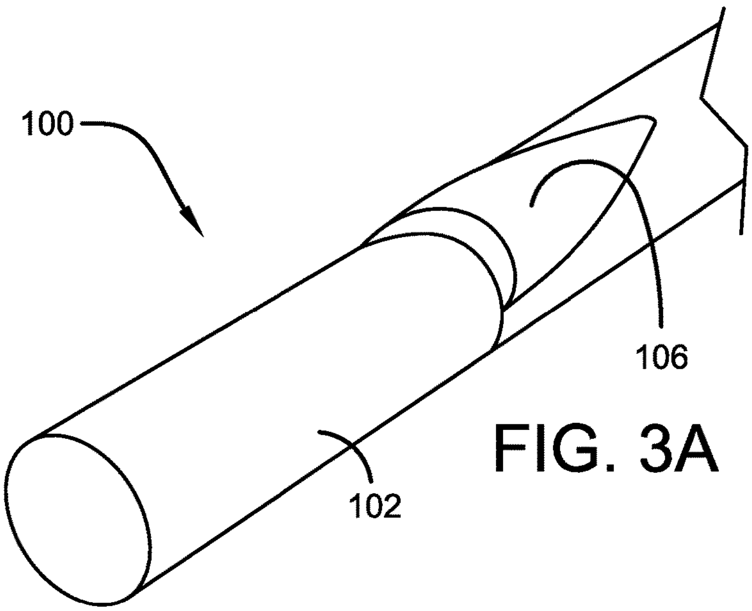
FIGS. 3A-B illustrate a perspective view of one embodiment of the crescent step hull device of the present invention showing the hull device as an added-on step in accordance with the disclosed architecture.
Figure 3B:
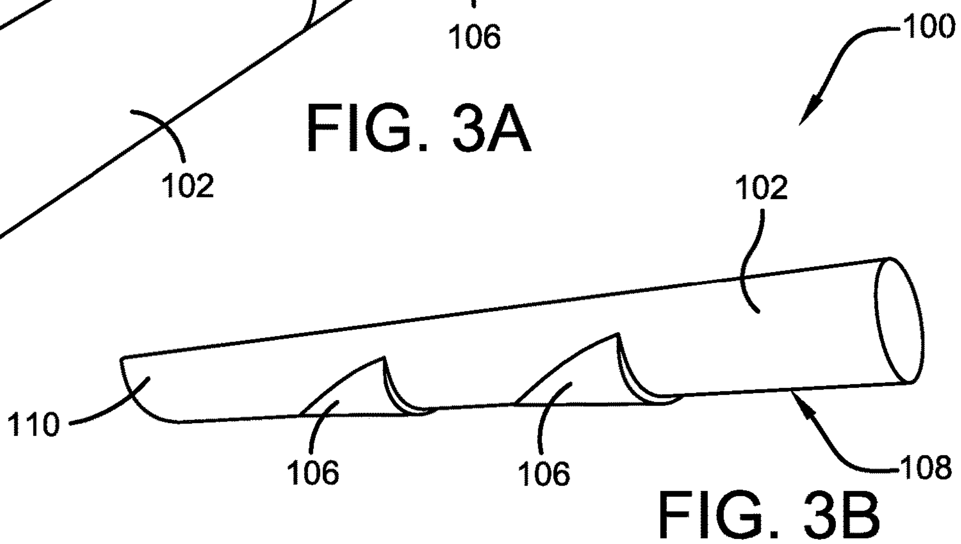

As shown in FIGS. 3A-B, the step 104, 106 in the hull 108 is at least one added-on step 106, which will create lift and reduce the wetted surface for less drag creating a more efficient bottom 110 with better performance. The added-on step 106 is a component or section that is added onto the bottom 110 of the hull 108. The added-on step 106 can be any suitable size and shape as is known in the art but is typically a crescent or wedge-like shape. Any suitable number of added-on steps 106 can be utilized on the hull 108 depending on the size of the hull 108 and the amount of lift a user wants to create. Further, the added-on steps 106 can be positioned in any suitable position on the bottom 110 of the hull 108. For example, a single added-on step 106 will provide two planing surfaces, or pressure points on a boat 112. It can maintain an optimum angle of attack while coming onto plane and running. In the case of a two stepped hull design, the lifting surfaces should be even more efficient, and certainly more so than the single surface that a non-stepped hull will deliver. In another embodiment, the added-on steps 106 may divide the hull bottom 110 into three planing surfaces, one being in the bow portion 126, a second being in the middle portion 200, and a third being in the stern portion 128. Thus, the added-on steps 106 on the bottom 110 of the hull 108 are positioned, such that they allow air from the added-on steps 106 to flow aftward 134, that is, toward the transom 130 of the stepped hulls 102. This air creates lift and reduces the friction between the hull 108 and the water 202.

Figure 4:
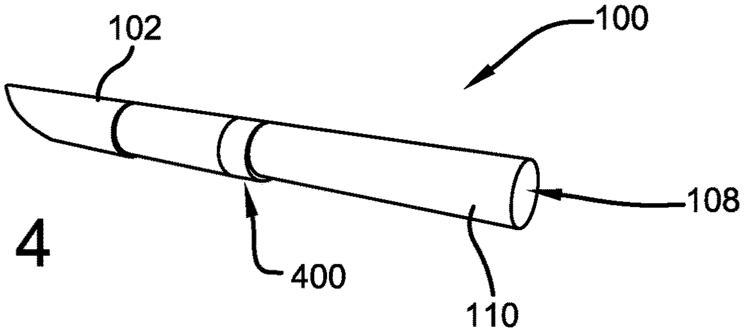
FIG. 4 illustrates a perspective view of one embodiment of the crescent step hull device of the present invention showing the hull device as a parallel step in accordance with the disclosed architecture.

As shown in FIG. 4, the step 104, 106 in the hull 108 is a parallel step 400. Wherein, the parallel step 400 on the bottom 110 of the hull 108 can either be created by reducing the diameter of the tube size of the hull 108 or by reshaping the tube at the notch point keeping it parallel or adjusting the angle compared to the keel 114 approximately + or −10 degrees. Thus, the purpose of adding the step device 100 to the keel 114 will reduce the wetted running surface, reducing drag and increasing performance and fuel efficiency.

Figure 5:
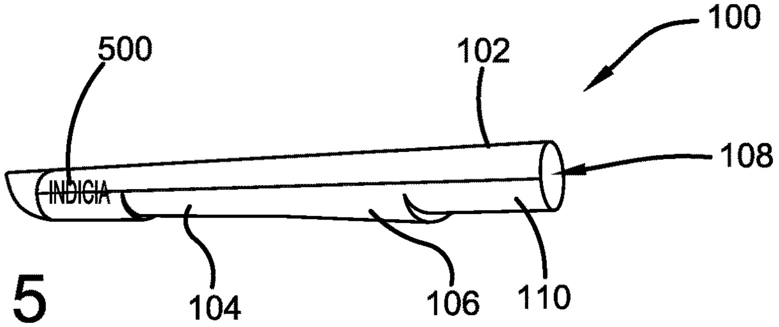
FIG. 5 illustrates a perspective view of one embodiment of the crescent step hull device of the present invention showing the hull device as a combination notched and added-on step in accordance with the disclosed architecture.

As shown in FIG. 5, the step 104, 106 in the hull 108 is a combination of at least one notched step 104 and at least one added-on step 106, which also creates lift and reduces the wetted surface for less drag creating a more efficient bottom 110 with better performance. Any suitable number of notched steps 104 and/or added-on steps 106 can be utilized as is known in the art, depending on the size of the hull 108 and the amount of lift a user wants to create. Further, the notched steps 104 and the added-on steps 106 can be positioned in any suitable position on the bottom 110 of the hull 108, as long as the steps 104, 106 are positioned, such that they allow air from the steps 104, 106 to flow aftward 134, that is, toward the transom 130 of the stepped hulls 102. This air creates lift and reduces the friction between the hull 108 and the water 202.

In yet another embodiment, the crescent step hull device 100 comprises a plurality of indicia 500. The body component 102 of the device 100 may include advertising, a trademark, or other letters, designs, or characters, printed, painted, stamped, or integrated into the body component 102, or any other indicia 500 as is known in the art. Specifically, any suitable indicia 500 as is known in the art can be included, such as but not limited to, patterns, logos, emblems, images, symbols, designs, letters, words, characters, animals, advertisements, brands, etc., that may or may not be hull, pontoon boat, or brand related.

Figure 6B:
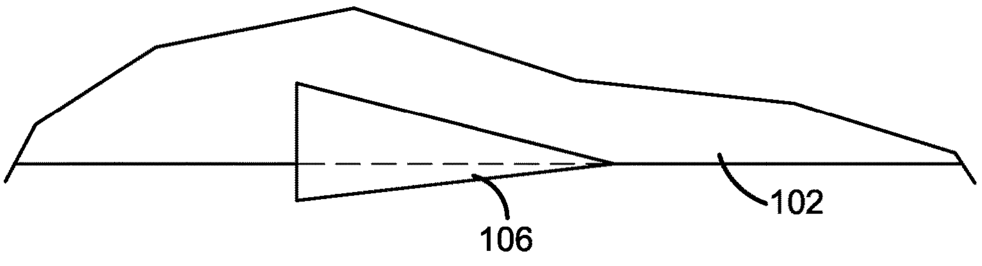

As shown in FIGS. 6A-B, in use, the stepped hull (i.e., body component 102) is secured to a pontoon boat. Specifically, the steps 104, 106 are incorporated into an aluminum or fiberglass pontoon boat hull 108. Further, stepped hulls 102 are hulls 108 that have either a transversal or longitudinal break on the hull bottom 110 called steps 104, 106, which are designed to reduce the amount of hull surface which is in contact with water. Unlike a regular boat, a stepped hull 102 has notches 104 or add-ons 106 from one side of the bottom 110 to the other, forcing water flow to separate from the hull 108 and reducing the contact surface. At speed, the steps 104, 106 separate much of the water running underneath from the hull 108, creating a vacuum and sucking in air, which mixes with the water 202. When a boat 112 is running on plane, water 202 runs along the bottom 110 wetting the complete underside of the hull 108. By placing notches 104 or add-ons 106 from one side of a boat bottom 110 to the other and perpendicular to the chines 122, you can force the water 202 flow to separate from the hull 108, thereby reducing the bottom surface area that comes in contact with the water 202. Less water contact equals less drag. While at slow speeds the entire hull bottom 110 is in the water 202, at higher speeds the water 202 to hull adhesion is broken by the steps 104, 106, and the aerated water aft 134 of the steps 104, 106 reduces hull drag.

Additionally, on a hull 108 with one step 104, 106, a second pressure point is created ahead of the step 104, 106, because the break in the water flow at the step 104, 106 acts like the water flow break at the transom 130. This second pressure point being more midship, moves the center of lift forward. If there are two steps 104, 106, there are two added pressure points that are ahead of the transom 130 pressure point, making the boat 112 lift with even less angle relative to the surface of the water 202. With the steps 104, 106 at different angles to each other, the boat 112, using these added pressure points, can ride flatter to the surface of the water 202. This lower angle of attack will provide more efficient attitude for improved ride and stability. Accordingly, where the steps 104, 106 are positioned is critical, because too much lift at a midship pressure-point can destabilize the hull 108 and too much lift at the bow portion 126 can induce stuffing. The optimum pressure of each step 104, 106 differs with each boat 112 design. Typically, the forward step 104, 106 should have minimal lift, the middle portion 200 step 104, 106 a little more and the aft step 104, 106 the largest.

Figure 7:
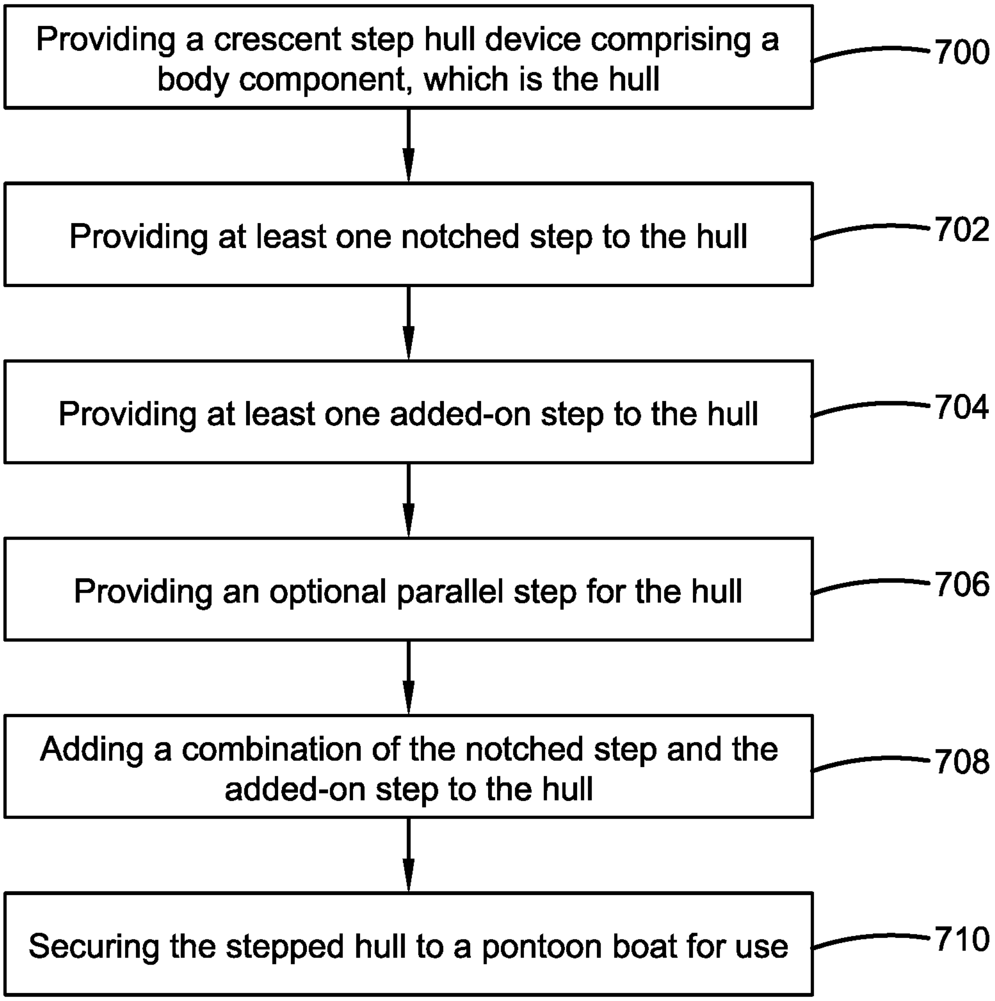
FIG. 7 illustrates a flowchart showing the method of including at least one step on a pontoon boat hull to reduce drag and improve fuel efficiency in accordance with the disclosed architecture.

FIG. 7 illustrates a flowchart of the method of including at least one step on a pontoon boat hull to reduce drag and improve fuel efficiency. The method includes the steps of at 700, providing a crescent step hull device comprising a body component, which is the hull. The method also comprises at 702, providing at least one notched step to the hull. Further, the method comprises at 704, providing at least one added-on step to the hull. The method comprises at 706, providing a parallel step for the hull. Further, the method comprises at 708, adding a combination of the notched step and the added-on step to the hull. Finally, the method comprises at 710, securing the stepped hull (i.e., the crescent step hull device) to a pontoon boat for use.

Certain terms are used throughout the following description and claims to refer to particular features or components. As one skilled in the art will appreciate, different users may refer to the same feature or component by different names. This document does not intend to distinguish between components or features that differ in name but not structure or function. As used herein "crescent step hull device", "step device", "hull device", and "device" are interchangeable and refer to the crescent step hull device 100 of the present invention.

Notwithstanding the forgoing, the crescent step hull device 100 of the present invention can be of any suitable size and configuration as is known in the art without affecting the overall concept of the invention, provided that it accomplishes the above stated objectives. One of ordinary skill in the art will appreciate that the crescent step hull device 100 as shown in FIGS. 1-7 is for illustrative purposes only, and that many other sizes and shapes of the crescent step hull device 100 are well within the scope of the present disclosure. Although the dimensions of the crescent step hull device 100 are important design parameters for user convenience, the crescent step hull device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A step hull device comprising:

a body component; and at least one step;

wherein the body component is a hull of a pontoon boat with the at least one step;

wherein the at least one step comprises a notched step or an added-on step;

wherein the pontoon boat comprises two to three hulls, connected by a deck which is surrounded by a frame;

wherein each of the hulls includes a hull bottom that includes a keel, a deadrise on either side of the keel, a chine at an interface between the deadrise and a sidewall, a bow portion, a stern portion, a transom in the stern portion, and a centerline running between the bow portion and the stern portion;

wherein the at least one step is a longitudinal notch or add-on that runs from a first chine to a second chine;

wherein each hull comprises 1, 2, 3, or 4 cross-sections or steps cut into or added onto each hull;

wherein the steps are from approximately ¼" to 4" in size to the hull bottom;

wherein the steps in a plan view, comprise angles measured from the centerline to the sidewall that can vary from approximately 0 to 50 degrees;

wherein the notched step is a cut-out of the hull bottom;

wherein the added-on step is a section that is added onto the bottom of the hull;

wherein the at least one step is a parallel step created by reducing a diameter of a tube size of the hull or by reshaping a tube at a notch point keeping it parallel or adjusting an angle compared to the keel approximately + or −10 degrees;

wherein the at least one step comprises a combination of at least one notched step and at least one added-on step; and further wherein the at least one step introduces air to a wetted surface, which will reduce surface tension or drag and improve overall efficiency of the pontoon boat.

2. A step hull device comprising:

a body component; and at least one step;

wherein the body component is a hull of a pontoon boat with the at least one step;

wherein the at least one step is a longitudinal notch or add-on that runs from a first chine to a second chine of the hull;

wherein the at least one step comprises a notched step or an added-on step;

wherein the notched step is a cut-out of a bottom of the hull;

wherein the added-on step is a section that is added onto the bottom of the hull;

wherein the hull comprises 1, 2, 3, or 4 steps cut into or added onto the hull;

wherein the at least one step is crescent-shaped;

wherein each of the steps is from approximately ¼" to 4" in size to the bottom of the hull;

wherein the steps in a plan view, comprise angles measured from a centerline running between a bow portion and a stern portion to a sidewall that can vary from approximately 0 to 50 degrees;

wherein the at least one step comprises a combination of at least one notched step and at least one added-on step; and further wherein the at least one step introduces air to a wetted surface, which will reduce surface tension or drag and improve overall efficiency of the pontoon boat.

3. The step hull device of claim 2, wherein the at least one step is a parallel step created by reducing a diameter of a tube size of the hull or by reshaping a tube at a notch point keeping it parallel or adjusting an angle compared to the keel approximately + or −10 degrees.

4. The step hull device of claim 2, wherein the bottom of the hull is divided into three portions, a bow portion, a middle portion, and a stern portion.

5. The step hull device of claim 4, wherein a step is positioned in each of the three portions.

6. The step hull device of claim 5, wherein the steps create three planing surfaces, which allow air from the steps to flow aftward, toward a transom of the hull to create lift and reduce friction between the hull and water.

7. The step hull device of claim 2, wherein the step is incorporated into an aluminum or fiberglass pontoon boat hull.

8. A method of including at least one step on a pontoon boat to reduce drag and improve fuel efficiency, the method comprising the following steps:

providing a crescent step hull device comprising a body component, which functions as a hull;

providing at least one notched step;

providing at least one added-on step;

adding a combination of the at least one notched step and the at least one added-on step to the hull to form a stepped hull; and securing the stepped hull to the pontoon boat for use.

* * * * *